Nov. 10, 1942.  R. L. WAGNER  2,301,763
METHOD AND APPARATUS FOR APPLYING METAL COATINGS
Filed Aug. 3, 1940  2 Sheets-Sheet 1

INVENTOR
ROBERT L. WAGNER
BY
ATTORNEY

Nov. 10, 1942.   R. L. WAGNER   2,301,763
METHOD AND APPARATUS FOR APPLYING METAL COATINGS
Filed Aug. 3, 1940   2 Sheets-Sheet 2

INVENTOR
ROBERT L. WAGNER
BY
ATTORNEY

Patented Nov. 10, 1942

2,301,763

UNITED STATES PATENT OFFICE 2,301,763

METHOD AND APPARATUS FOR APPLYING METAL COATINGS

Robert L. Wagner, Niagara Falls, N. Y., assignor to Haynes Stellite Company, a corporation of Indiana Application August 3, 1940, Serial No. 350,923

18 Claims. (Cl. 117—46)

The present invention relates to welding and brazing operations; and more especially it concerns a method and apparatus whereby uniform, smooth welded-on overlays, coatings or facings may readily be applied to the surfaces of metal articles. The invention has especial utility for the deposition, upon the annular seating surfaces of valves and other articles in the shape of solids of revolution, of uniform smooth overlays of uniform selected thickness of wear-resistant and/or corrosion-resistant metals and alloys, such as those of the class of non-ferrous alloys composed of cobalt, chromium and tungsten. For convenience, the following description is directed principally to this application of the invention.

The seating surfaces of valves and valve seats commonly are provided with surface layers of protective metal by a manual operation using fusion welding methods employing an oxy-acetylene torch or the equivalent for supplying the high temperature heat.

This manual procedure, while widely used, is extremely slow and tedious. Slight variations in technique employed by even an expert operator may result in an inferior product or be wasteful of the relatively costly overlay metal. Since the removal of any of the very hard surfacing metal after formation of the surfaced article necessitates a tedious grinding procedure, it becomes very important, from a practical standpoint, that the layer of surfacing metal of each successive article be smooth and uniform as deposited, and that it be intimately bonded to the metal of the article without undue interalloying of the two compositions. In manual operations, as a result of non-uniform treatment of successive valve parts or other articles, a substantial percentage of the surfaced valve parts must be rejected or rewelded. Slight overheating of the valve metal during such operation results in excessive interalloying of the matrix metal and overlay metal, thereby providing zones of weakness in the layer of protective metal. Insufficient heating of the matrix metal and overlay metal may result in insufficient bonding thereof, and the production of a defective product having a rough, uneven surface coating. Since defects in the finished article are generally latent, and appear only during testing of the article or in actual service, there is great need for a practicable procedure and apparatus insuring the production of a succession of valves or other articles uniformly free from such defects.

Among the more important objects of the present invention are: to provide upon the wearing surfaces of valves, valve seats and other articles, layers or overlays of protective metal, yielding composite articles uniformly of a high quality, free from the defects resulting from non-uniform bonding of the matrix metal and overlay metal or from segregation of alloying components; to provide in novel manner for the production of overlays of protective metal upon selected surfaces of metal articles while preventing undue interalloying of the protective metal and the metal of the article; and to provide for the production of a succession of articles provided with substantially identical curvilinear welded-on, smooth deposits of a protective metal. These and other objects will be evident as the following description proceeds.

In the accompanying drawings, illustrating one preferred embodiment of the invention adapted for providing an annular overlay of wear-resistant metal to the wearing surface of a valve head, Fig. 1 is a front view, partly in section, of the general apparatus assembly, parts being omitted, and other parts being broken away;

Figure 1:
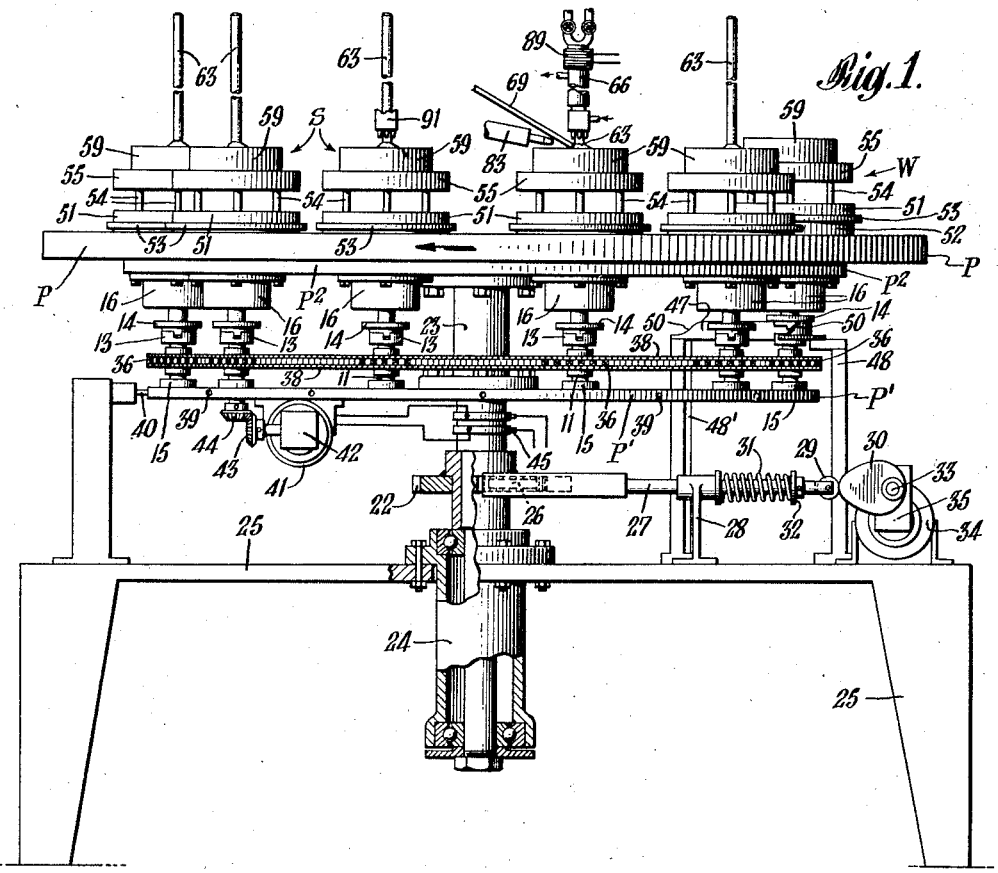

Referring to the accompanying drawings, the apparatus comprises a plurality of individual work tables W, each having a corresponding spindle assembly S mounted for rotation upon a circular rotatable platform P, and a circular sub-platform P'. Each spindle S is formed of two aligned sections 11, 12, which respectively carry the interlocking members 13, 14 of a clutch assembly C. The lower end of each spindle member 11 is housed for rotation in a bracket 15 mounted on sub-platform P'. Spindle member 12 is supported for rotation and for axial movement in a bearing housing 16 secured to a member P² which in turn is secured to platform P. Housing 16 has ball races 17, 17 mounted therein in spaced relation by means of spacing members 18, 18', and the lock nuts 19, 19'. The assembly of ball races and spacing members are secured to a tubular flanged collar 20 slidable on spindle member 12. A Woodruff key 21 set in member 12 extends into a longitudinal slot in member 20. This arrangement permits both rotation and axial movement of each work table W relative to the platforms P, P'. The platforms P and P' are mounted for rotation on a vertical shaft 23 supported in thrust bearings in a housing 24 supported on a frame 25.

For rotating the platforms P, P' at uniform intervals through a selected arc, and for intermittently maintaining each work table at rest at a selected work station during a selected period of time, a ratchet 22, secured to shaft 23, meshes with a pawl 26. The latter is carried by a rod 27 supported in a bracket 28, and has a bifurcated end that houses a wheel 29, adapted pressingly to contact the surface of a cam member 30, under action of a spring 31 operatively interposed between a collar on bracket 28 and a collar 32 secured to the rod 27. The cam 30 is mounted for rotation upon a shaft 33 driven by a motor 34 through a reduction gear 35.

For rotating each of the work tables W, there is provided on each spindle member 11, a corresponding pinion 36, each of which is connected with the others by means of an endless chain 38. For locking the platforms P and P' in selected position at the respective work stations there is formed, in the side of the sub-platform adjacent each spindle, a depression 39 adapted to receive a spring-pressed pin 40, the latter being secured to a housing member associated with the support 25. A motor 41 is connected, through a reduction gear 42 and bevel gears 43, 44, with one of the spindle members 12, whereby operation of the motor causes rotation of each spindle at the same fixed rate. Motor 41 is energized by electric current flowing thereto through a brush and slip ring device 45.

For discontinuing rotation of one or more work tables at a selected point or points in the path of travel of the platform P, a short arcuate clutch-actuating member 47 is supported on frame 25 through brackets 48, 48'. In the form shown, the member 47 is a curved angle iron member having the upper margin 49 of its vertically extending portion tapered at the respective ends, as shown at 50, and disposed in the path of the outer lower margin of the clutch member 14, at a zone located ahead of the welding station in the path of travel of platform P. The arrangement of parts is such that, as each table W approaches the member 47, clutch member 14 of that table is engaged thereby, and disconnects the spindle member 12 from member 11, whereby rotation of that work table ceases. The work then may be removed from that table, and replaced with other work to be processed. Preferably, the distance between the untapered portions of the clutch-actuating member 47 is approximately equal to the distance between two work tables, so that two articles may be changed simultaneously, if desired.

Figure 2:
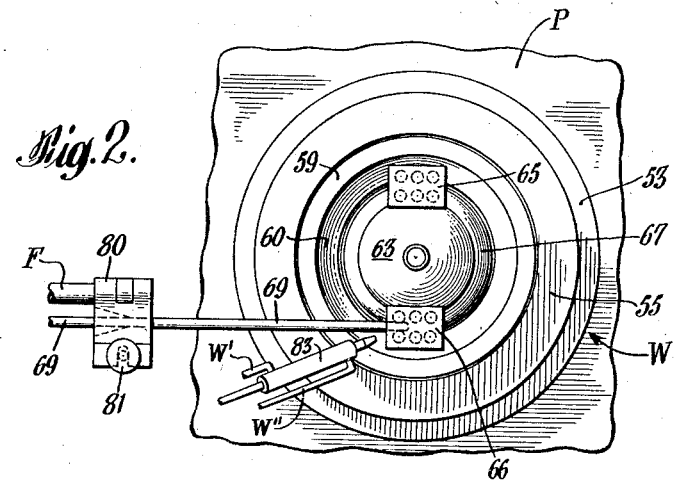
Fig. 2 is a top view of a work table and associated parts, portions being broken away.
Figure 3:
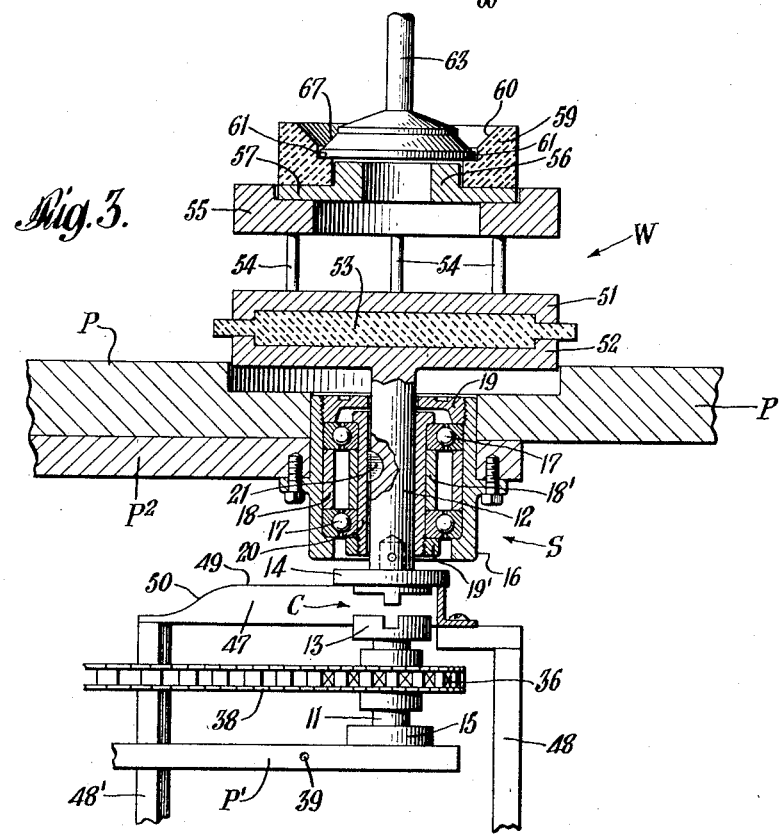
Fig. 3 is an elevation, partially in section, of a work table and associated parts, parts being broken away.

The individual work tables W, shown in detail in Figs. 2 and 3, are identical, and comprise interassociated spaced metal supporting plates 51 and 52, and an intermediate plate 53 of heat-insulating material such as transite board. The lowermost plate of each group is secured to a corresponding spindle member 12. Supported on the upper plate 51 associated with each work table, in spaced relation to that plate, by means of a plurality of spacing members 54, is an annular member or supporting ring 55 of heat-resistant and heat-conductive metal, such as copper or chrome iron, having a flanged outer margin on its upper surface. An annular member 56, also of heat-resistant, heat-conductive metal, is supported at its outer margins upon ring 55, and has an inner flange 57 adapted to support an annular work-supporting member 59 of heat-refractory material such as alundum. The latter has an inwardly and downwardly tapered upper surface 60 provided with an annular step or groove 61 therein adjacent the inner margin, adapted to contact a narrow annular portion of the head of a valve 63 of the poppet-type and support said valve.

Supported in fixed position above a preheating and welding station, to which each successive work table is brought in turn during operation of the apparatus, are two welding torches 65, 66, each preferably having a plurality of individual torch tips directed to impinge high temperature flames upon an annular zone 67 of the valve head at points respectively equidistant from the longitudinal axis of the valve. The torches 65, 66 preferably are disposed upon opposite sides of the valve stem for reasons hereinafter stated. Each torch 65, 66 has a mixing chamber, and means for conducting selected amounts of a fuel gas and oxygen to the latter. Likewise, each torch head is provided with the usual cooling jacket and associated means for circulating a cooling fluid around the torch tips. (See Fig. 1.)

The arrangement of parts is such that, during rotation of each work table at the welding station, the respective torches 65, 66 impinge welding flames on successive portions of an annular zone of the valve head to receive or receiving the overlay metal, the width of such zone being determined by the location of the respective torches and by the number and distribution of the torch tips.

For supplying a uniform selected quantity of molten protective metal to the annular surface of each successive valve to be provided therewith, a welding rod 69 of the protective metal is frictionally supported between two pulleys 71, 72. The first-named pulley is driven by a universal motor 73 through a reduction gear 74. The other or idler pulley 72 is mounted for free rotation upon a member slideable longitudinally toward pulley 71 in a casing 76 which houses a spring (not shown). The latter is operatively interposed between pulley 72 and a cam member 78 mounted on casing 76, and adapted, in one position, to yieldingly press the idler pulley against the welding rod and, in another position, to release the pressure of the idler pulley on the rod. The rod-feed motor, pulleys and associated parts may be secured upon a suitable support 79 which is carried by a bracket (not shown) on frame 25, and is independent of the platform P and work tables, permitting universal adjustment of this mechanism in well-known manner. A welding rod guide member 80, formed of two grooved members hinged together, is connected by rod F with support 79 in spaced relation to the pulleys, for adjustment relative to the latter. A swiveled latch 81 and associated parts adapt the hinged members to be releasably locked together.

Figures 4, 5:
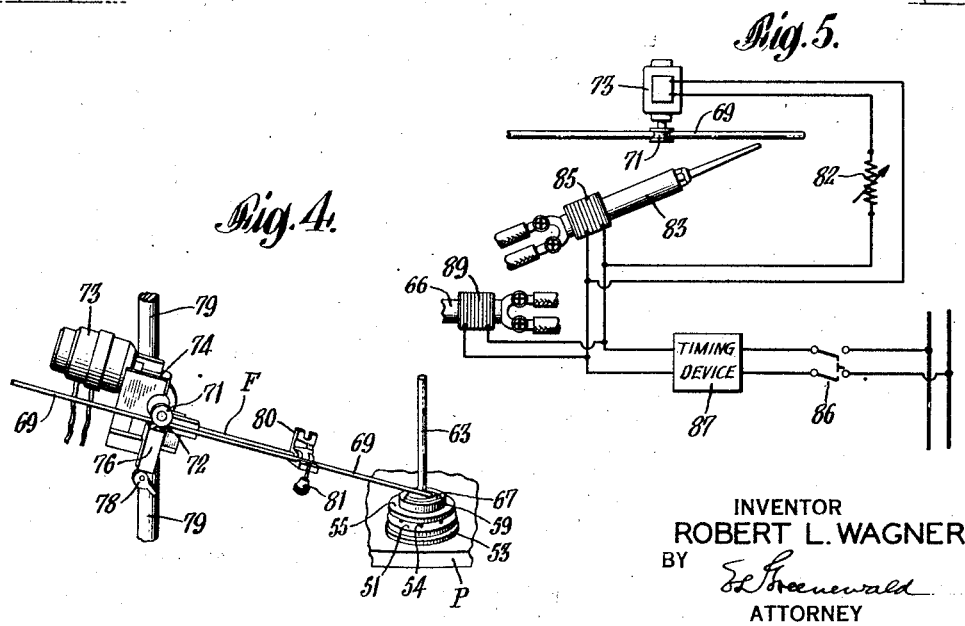
Fig. 4 is a fragmentary perspective view, showing an assembly of a work table, valve, a welding rod and rod-feeding mechanism, parts being broken away.
Fig. 5 is a wiring diagram of an electric circuit controlling the rod-feeding mechanism and rod-preheating torch.

As shown in Fig. 5, the electric circuit operating the rod-feed motor 73 has therein a variable resistance 82 for regulating the motor speed and the rate of rod-feed. A rod-preheating torch 83 of usual design having a water jacket with water inlet and outlet W' W'', is mounted for universal adjustment on a suitable support (not shown) independently of the rotatable platform P, and of the support 79. The torch 83 is adapted to direct a preheating flame upon the rod 69 at and closely adjacent an end thereof upon which the melting flames from torch 66 are directed. The rod-preheating torch has the usual inlets for fuel gas and oxygen, and with means for circulating a cooling fluid through the torch head; and preferably is provided with a quick-acting solenoid-controlled valve 85 for cutting off the flow of combustible gas mixture to the torch tip.

The valve 85 is in the circuit operating the motor 73. A main switch 86 in the circuit permits cutting off the flow of current concurrently to the rod-feeding motor 73 and to the gas valve 85 whereby, when the switch is closed, current normally flows to actuate the motor and to open the valve. A delayed action switch or interval timer 87, of standard construction, is disposed in the circuit whereby, upon closing the main switch, the circuit remains closed for a preselected interval of time, depending upon the adjustment of the delayed action switch, after which the latter functions to open the circuit, thereby stopping forward movement of the welding rod, and cutting off gas flow to the rod-preheating torch.

Generally, when depositing a non-ferrous alloy of cobalt, chromium and tungsten, it is advantageous to reduce the flow of gas to the torches 65, 66, at the time application of the protective metal is begun. This conveniently may be effected by providing one or both of those torches with a quick-acting solenoid-controlled gas flow reducing valve 89 (see Fig. 1) in the electric circuit operating the rod-feeding motor, whereby the said valve 89 is partially closed when said motor is energized, and is fully reopened in well-known manner when action of the timing device 87 opens the circuit.

In the practice of the invention utilizing apparatus of the type described, assuming a work table W being positioned at the welding station with a valve 63 positioned thereon and supported at its outermost margin, as shown in Figs. 3 and 4, rotation of the work tables W is begun at a selected rate, and the work-preheating torches 65, 66 are lighted. The table preferably is rapidly rotated at a speed of between 30 and 50 revolutions per minute when resurfacing the seating surfaces of the usual type of poppet valves utilized in airplane motors.

These torches, as well as the other torches hereinafter described, preferably are of the oxy-fuel gas type, using mixtures of oxygen and acetylene. The proportions of fuel gas and oxygen flowing to the respective torches are preferably adjusted to provide a gas mixture or mixtures in which the volume of oxygen is less than that required for complete combustion of the fuel gas. The flames produced by the combustion of such mixtures are referred to as "carburizing flames" and as "excess fuel gas flames." The oxyacetylene mixtures described in the United States Patent No. 1,973,341 of Harry S. George are well adapted for use in the process.

As heating of the valve 63 proceeds, an annular zone to be surfaced is gradually brought to a temperature suitable for satisfactory welding of the protective metal to the valve metal,—during at least one complete revolution of the table. When the desired welding temperature is reached, the main switch 86 is closed, and the forward end of the welding rod 69 is slowly fed beneath the flame from torch 66 while being preheated by the rod-preheating torch 83. Thus, the end of the rod is gradually melted at a uniform selected rate and the molten drops deposit upon successive portions of the annular preheated zone passing beneath the torch 66.

The metal thus deposited, while still molten, passes beneath the flames from torch 65 where additional heat is supplied, thereby spreading the molten metal thus deposited in a more or less uniform thin layer over the surface within the said annular zone, and intimately welding the valve metal and the protective metal. When the exact preselected amount of protective metal required for surfacing each valve has been deposited in the said annular zone, as controlled by the aforesaid timing mechanism or the equivalent, the rod-feed and rod-preheating is discontinued, whereby deposition of metal ceases.

The rotating work table and valve thereon may remain in position beneath the welding torches for a limited period of time after discontinuing the rod-feeding mechanism, for further smoothing the molten deposit of protective metal, if necessary. The total time required for preheating and coating a valve head about two inches in diameter is approximately ninety seconds. The platform P then is rotated by means of motor 34 to move the work table and the surfaced valve to the next indexed position or reshaping station, thus bringing the succeeding work table and valve beneath the flames from torches 65, 66 at the welding station.

At the reshaping station, or new position of the work table carrying the valve with its still molten layer of wear-resistant protective metal, the molten protective metal has impinged thereon a flame or flames of relatively low intensity from another torch 91, similar to torch 66, while rotating the valve. The last-named flame is so adjusted that slow, regulated cooling and gradual solidification of the molten deposit on the valve occurs, during the preheating of, and application of the protective metal to, the next succeeding valve. Thus the cooling and solidification of the exposed surface of the protective metal are regulatably retarded, while the cooling of the opposite surface of the valve head may be accelerated by a stream of cool air blown or otherwise flowing thereto from around the pins 54 and the passages defined by annular members 55, 55. Such slow regulated cooling of the overlay metal has been found to improve materially the homogeneity and soundness of the deposited metal; to prevent or minimize segregation of components of the alloy; and greatly to facilitate a selected reshaping of the exposed surface of the deposited metal, where necessary to provide a desired smooth contour, by suitable adjustment of the angle at which the so-called "cooling flame" from torch 91 impinges upon the body of overlay metal.

The herein described process and apparatus have made possible the continuous production of a succession of valves, each provided with identical welded-on overlays of protective metal, under the control of a single operator. In practice it has been demonstrated that one operator may easily attain a production rate of 40 to 50 valves per hour,—as contrasted with a rate of 5 to 7 valves per hour when the valves are processed manually by an experienced operator. Higher production rates are possible by preheating the articles prior to the arrival thereof at the welding or overlay-depositing station. The preheating preferably is conducted in a non-oxidizing atmosphere such as a reducing gas or an inert gas.

The valves produced by the foregoing procedure are uniform and of good quality, whereas valves processed manually are apt to vary in quality according to the operator and to the operating conditions selected for each operation. While in many instances very satisfactory valves having metal overlays free from objectionable segregation, porosity and undue variations in their physical properties are secured without the use of the slow cooling flame at the aforesaid reshaping station, in certain other instances such supplemental treatment of the composite article has proved highly desirable for the production of valves having intimately bonded homogeneous overlays of uniform hardness.

While in a large number of instances the use of a flux in the process is unnecessary, other instances exist where a flux is advantageous or necessary. It then is customary to apply the flux to the annular seating surface of the valve or other article prior to the preheating step. The flux may be painted upon the said surface; or the rod of protective metal may be coated with the flux, and thus applied.

When providing the beveled seating surfaces of valves and the like with welded-on overlays of wear- and corrosion-resistant metal or alloy, such surfaces are usually disposed at angles of from 30° to 45° with the horizontal during the surfacing operation. Hence, in operations in which fluxes are desirable, ordinary fluxes flow down the coated surface, particularly during the preheating stage, leaving bare the metal, which may become oxidized. Certain relatively viscous fluxes, such as calcium and magnesium silicates, and mixtures of these silicates with sodium silicate, when applied to the beveled surfaces, will stay in place during the preheating step. However, because of their high viscosities, these fluxes sometimes interfere later with the flow of the overlay metal. This serious disadvantage may be overcome by applying a primary viscous flux of the aforesaid type to the beveled surface to receive the metal overlay, and by feeding to the welding zone with the rod of overlay metal,— preferably as a coating on the rod, a small amount of a low-melting flux such as borax, boric oxide, or a borosilicate glass. The latter melts simultaneously with the overlay metal, and thins the viscous primary flux to a suitable consistency for the welding-on operation. Such flux combinations are particularly advantageous when surfacing steels containing chromium.

It will be understood that various departures may be made from the method and apparatus specifically described within the spirit of the invention. Thus, instead of using a delayed action or timing mechanism 87 for discontinuing the feed of surfacing metal after a preselected amount has been applied to an article, means may be associated with the welding rod for tripping a switch in the rod-feeding circuit when said means reaches a fixed point in its path, thereby stopping forward feed of the rod, and cutting off the gas supply to torch 83.

The term "protective metal," and similar terms, are used in the claims to embrace both alloys and metals that are capable of protecting metals or alloys surfaced therewith.

The invention is susceptible of modification within the scope of the appended claims.

I claim:

1. Process for providing the wearing surfaces of metal articles with annular welded-on overlays of protective metal, which comprises rapidly rotating said article at a uniform rate about a vertically-disposed axis; directing at least two oxy-fuel gas flames of welding temperature successively upon selected portions of said article within an annular zone thereon, thereby preheating the metal of the article at and adjacent said annular zone to a welding temperature; and thereafter progressively depositing a preselected amount of molten protective metal at a uniform rate upon successive portions of the article within said annular zone while continuing rapid rotation of the article.

2. Process for providing the wearing surfaces of metal articles with annular welded-on overlays of protective metal, which comprises rotating said article at a uniform rate about a vertically-disposed axis; directing at least two oxy-fuel gas flames of welding temperature upon successive portions of said article at spaced points within an annular zone thereon, thereby preheating the metal of the article at and adjacent said annular zone to a welding temperature; thereafter progressively depositing a preselected amount of molten protective metal at a uniform rate upon successive portions of the article within said annular zone; discontinuing the deposition of said molten metal after a preselected amount thereof has been deposited in said annular zone, and thereafter flame-smoothing the annular molten deposit while retarding the cooling and solidification of the exposed surface portion thereof, and while accelerating the cooling of the metal of the article below the deposited metal.

3. Process for providing the wearing surface of valves and similar metal articles with welded-on overlays of a protective metal, which comprises rotating said article at a uniform rate about a vertically-disposed axis, directing oxy-fuel gas flames of welding temperature upon an upper surface of said article within an annular zone on said surface, thereby preheating the article at and adjacent said surface to a welding temperature, thereafter progressively depositing a molten protective metal at a uniform rate upon successive portions of the preheated article to form an annular layer of such metal within said annular zone, while maintaining the deposited metal in molten condition, thereafter discontinuing such metal deposition and directing upon successive portions of the exposed surface of the molten deposit a flame of low intensity insufficient to maintain the deposit in molten condition, while exposing the lower surface of said article to a cooling medium, whereby cooling and solidification of the deposited metal occurs progressively toward the exposed surface thereof, thereby minimizing segregation of components of the deposited metal.

4. Process for providing the wearing surface of valves and similar metal articles with welded-on overlays of a protective metal, which comprises supporting upon an annular member a poppet-type valve along an annular zone at the outer margin of the valve head, said valve having an annular seating surface supported at an acute angle with the horizontal, preheating said valve at and adjacent said seating surface to a welding temperature, directing at least one welding flame upon successive portions of said annular seating surface while maintaining said flames at a selected distance from the plane of said seating surface, and concurrently depositing a pre-selected quantity of molten protective metal in successive portions, at a uniform rate upon such preheated surface.

5. Process for providing the wearing surface of valves and similar metal articles with welded-on overlays of a protective metal, which comprises supporting a poppet-type valve along an annular zone at the outer margin of the valve head, said valve having an annular seating surface supported at an acute angle with the horizontal, preheating said valve at and adjacent said seating surface to a welding temperature, thereafter directing at least one welding flame upon successive portions of said preheated annular seating surface while maintaining said flames at a selected distance from the plane of said seating surface, and concurrently depositing successive molten portions of a protective metal upon such preheated annular seating surface at a uniform selected rate, to form a homogeneous annular metal coating on said surface, while exposing the underside of the valve head to the action of a cooling medium.

6. Process for providing the wearing surface of valves and similar metal articles with welded-on overlays of a protective metal, which comprises supporting a poppet-type valve along a narrow zone at the outer margin of the head of said valve, directing at least one preheating flame of welding temperature having reducing characteristics upon successive portions of an annular seating surface of said valve to bring such portions to a welding temperature, while rapidly rotating the valve on its longitudinal axis, thereafter, while continuing such rapid rotation directing at least one welding flame having reducing characteristics upon successive portions of the preheated annular seating surface while maintaining said flames in selected relation to said seating surface, and concurrently depositing successive molten portions of a protective metal upon such preheated seating surface at a uniform selected rate to weld an annular layer of protective metal on said surface, and thereafter discontinuing such deposition of protective metal while directing a smoothing flame of welding temperature upon the deposited metal while continuing rotation of said valve, thereby uniformly smoothing the exposed surface of the deposited metal.

7. Process for providing a beveled wearing surface of an article with a welded-on overlay of a protective metal, which comprises disposing the article with said surface at an acute angle with the horizontal, applying a coating of a viscous high-melting flux to said surface, directing a plurality of preheating flames of welding temperature upon said surface, thereby preheating the latter to a welding temperature while protecting said surface by a viscous coating of said flux, thereafter directing at least one welding flame upon successive portions of said preheated surface while concurrently depositing thereon a body of molten protective metal and a low-melting flux, the last-named flux being present in amount sufficient to dilute said viscous flux and prevent interference of the latter with the free flow of the molten protective metal upon said surface.

8. Process for providing the wearing surfaces of metal articles with welded-on overlays of protective metal, which comprises supporting a plurality of said articles in spaced relation on a movable support, intermittently moving said support a selected distance along a fixed path and thereafter discontinuing said movement, thereby defining a plurality of stations including at least one work station and at least one work-loading station, continuously rotating each of said work tables at a selected rate during the period only when the latter is at a station other than said work-loading station, feeding protective metal to the upper surface of each of a succession of articles while such article is located at a work station, concurrently directing a plurality of welding flames upon said upper surface and upon said body of protective metal, discontinuing the feed of protective metal to each successive article after a preselected amount of said metal has been deposited upon each such article, and applying to successive portions of the metal-coated surface of the article a flame of an intensity insufficient to maintain the deposit in molten condition but sufficient to control the rate and direction of cooling and the solidification of the deposited metal, while exposing the opposite side of the article to a cooling fluid.

9. Apparatus for applying annular welded-on overlays of protective metal upon a surface of an article of revolution, which comprises a support for such article; means for rotating said support upon a vertically-disposed axis; torch means for directing welding flames upon a selected annular portion of an upper surface of such article while thus supported; means for feeding a body of protective metal to such surface; means for preheating said body of protective metal during such feed thereof; means for concurrently reducing the flow of welding gases to said torch means and for actuating the respective metal feeding means and metal preheating means; and automatic mechanism operatively associated with said metal-preheating means for rendering the last-named means inoperative after a selected amount of said protective metal has been fed to said article.

10. Apparatus for applying annular welded-on overlays of protective metal upon an annular surface zone of an article of revolution, which comprises means for rotating said article upon a vertically-disposed axis at a uniform selected rate; means for feeding successive portions of a body of protective metal upon an annular zone on the upper surface of said article; torch means for repeatedly directing upon spaced portions of said annular zone in rapid sequence a plurality of welding flames; independent means for preheating said body of protective metal; and automatic means operatively associated with said feeding means and with said protective metal-preheating means for discontinuing said feeding means and said protective metal preheating means after a selected amount of the protective metal has been fed to the surface of said article.

11. Apparatus for applying annular welded-on overlays of protective metal upon an annular surface zone of an article of revolution, which comprises means for rotating said article upon a vertically-disposed axis at a uniform selected rate; means for feeding successive portions of a body of protective metal to an annular zone on the upper surface of said article; torch means for directing upon spaced portions of said annular zone a plurality of preheating and welding flames for heating said zone to a welding temperature; independent means associated with said feeding means for preheating successive portions of said body of protective metal; automatic means for discontinuing said feeding means and said protective metal preheating means after a selected amount of the protective metal has been fed to the surface of said article; and torch means for smoothing the surface of the molten protective metal thus deposited on said article, and for controlling the rate and direction of cooling and solidification of the deposited metal.

12. Apparatus for applying annular welded-on overlays of protective metal upon an annular surface zone of a metal article of revolution, which comprises means for rotating such article upon a vertically-disposed axis at a uniform selected rate; supporting means for said article adapted to contact a narrow zone of said article adjacent the outer periphery, whereby the lower surface of the article is exposed to the atmosphere; heating means for directing an oxy-fuel gas welding flame upon an annular zone on the upper surface of said article; means for feeding an elongated body of protective metal at a uniform selected rate to said annular zone; and independently adjustable torch means for preheating said body of protective metal.

13. Apparatus for applying annular welded-on overlays of protective metal upon an annular surface zone of a metal article of revolution, which comprises means for rotating such article upon a vertically-disposed axis at a uniform selected rate; supporting means for said article adapted to contact a narrow zone of said article adjacent the outer periphery, whereby the lower surface of the article is exposed to the atmosphere; heating means for directing an oxy-fuel gas welding flame upon an annular zone on the upper surface of said article; means for feeding an elongated body of protective metal at a uniform selected rate to said annular zone; independent torch means for preheating said body of protective metal; mechanism for concurrently initiating operation of said feeding means and said torch means; and automatic means operatively associated with said mechanism, for rendering the latter inoperative after a selected time interval.

14. Apparatus for applying annular welded-on overlays of protective metal upon an annular surface zone of a metal article of revolution, which comprises means for rotating such article upon a vertically-disposed axis at a uniform selected rate; supporting means for said article adapted to contact a narrow zone of said article adjacent the outer periphery, whereby the lower surface of the article is exposed to the atmosphere; heating means for directing an oxy-fuel gas welding flame upon an annular zone on the upper surface of said article; means for feeding an elongated body of protective metal at a uniform selected rate to said annular zone; torch means adjacent said heating means for preheating said body of protective metal; mechanism for concurrently initiating operation of said feeding means and said torch means; and automatic means operatively associated with said mechanism, for rendering the latter inoperative after said feeding means has fed a selected amount of protective metal to said annular zone.

15. Apparatus for applying annular welded-on overlays of protective metal upon an annular surface zone of a metal article of revolution, which comprises means for supporting said article along a narrow annular zone adjacent the outer periphery of the article, with the lower surface of the latter exposed to the atmosphere; means for rapidly rotating said article and support upon a vertically-disposed axis at a uniform rate; at least one torch means adapted to direct welding flames upon successive portions of said article within an annular zone in the upper surface of the article; means for feeding a body of protective metal at a uniform rate to said annular zone in the path of the flames from said torch means; independently controlled means for preheating said body of protective metal; automatic means for concurrently discontinuing said feeding means and said last-named preheating means after a selected amount of protective metal has been fed to said annular zone; and means for regulating the rate of feed of said feeding means.

16. Apparatus for applying annular welded-on overlays of protective metal upon an annular surface zone of a metal article of revolution, which comprises means for supporting said article along a narrow annular zone adjacent the outer periphery of the article, with the lower surface of the latter exposed to the atmosphere; means for rotating said article and support at a uniform rate; at least one torch means adapted to direct welding flames upon successive portions of said article within an annular zone in the upper surface of the article; means for feeding a body of protective metal at a uniform rate to said annular zone in the path of the flames from said torch means; independent means for preheating said body of protective metal; and independently controlled torch means for smoothing the free surface of the deposited protective metal and for delaying the cooling and solidification of the protective metal at the last-named surface, during air cooling of the surface of the article opposite that having thereon the protective metal.

17. Apparatus for applying annular welded-on overlays of protective metal upon an annular surface zone of a metal article of revolution, which comprises a platform; a plurality of work tables supported on said platform in spaced relation; means for intermittently moving said platform a selected distance along a fixed path, and for discontinuing such movement after a selected time interval, thereby defining at least one work station and at least one work-loading station visited in turn by successive work tables; means for rotating each of said work tables; means for discontinuing the rotation of each work table while it is disposed at a work-loading station; work surfacing mechanism at a work station, and comprising means for concurrently feeding protective metal to a selected zone on the upper surface of said article and for preheating such metal, torch means for directing upon said selected zone of said article a succession of preheating and welding flames; means exposing the surface of the article opposite said upper surface to a cooling medium; and means for discontinuing the respective protective metal feeding and preheating means after a preselected amount of said metal has been deposited on said article.

18. Apparatus for applying annular welded-on overlays of protective metal upon an annular surface zone of a metal article of revolution, which comprises a platform; a plurality of work tables supported on said platform in spaced relation; means for intermittently moving said platform a selected distance along a fixed path, and for discontinuing such movement after a selected time interval, thereby defining at least one work station and at least one work-loading station visited in turn by successive work tables; means for rotating each of said work tables; means for discontinuing the rotation of each work table while it is disposed at a work-loading station; work surfacing mechanism at a work station, and comprising means for feeding protective metal to a selected zone on the upper surface of said article, torch means for directing upon said selected zone of said article a succession of preheating and welding flames; means exposing the surface of the article opposite said upper surface to a cooling medium, and automatic adjustable means for discontinuing the respective protective metal feeding and preheating means after a selected time interval.

ROBERT L. WAGNER.